US012604183B2

(12) United States Patent
Singh et al.

(10) Patent No.: US 12,604,183 B2
(45) Date of Patent: Apr. 14, 2026

(54) SECURE MESSAGING FOR OUTAGE EVENTS

(71) Applicant: ITRON, INC., Liberty Lake, WA (US)

(72) Inventors: Kalvinder Pal Singh, Miami (AU); Darin Byron Johnson, San Jose, CA (US); Zoltan Peter Kiss, Los Altos, CA (US)

(73) Assignee: ITRON, INC., Liberty Lake, WA (US)

( * ) Notice: Subject to any disclaimer, the term of this patent is extended or adjusted under 35 U.S.C. 154(b) by 28 days.

(21) Appl. No.: 18/517,948

(22) Filed: Nov. 22, 2023

(65) Prior Publication Data

US 2024/0089729 A1     Mar. 14, 2024

Related U.S. Application Data

(63) Continuation of application No. 17/124,428, filed on Dec. 16, 2020, now Pat. No. 11,843,939.

(51) Int. Cl.
| | |
|---|---|
| *H04W 12/033* | (2021.01) |
| *G06F 1/3234* | (2019.01) |
| *G06F 1/3287* | (2019.01) |
| *H04L 9/08* | (2006.01) |
| *H04L 9/40* | (2022.01) |
| *H04L 41/06* | (2022.01) |

(Continued)

(52) U.S. Cl.
CPC ........ *H04W 12/033* (2021.01); *G06F 1/3275* (2013.01); *G06F 1/3287* (2013.01); *H04L 9/0819* (2013.01); *H04L 9/0894* (2013.01); *H04L 41/06* (2013.01); *H04L 41/28* (2013.01);

*H04L 63/0428* (2013.01); *H04L 63/062* (2013.01); *H04L 63/123* (2013.01); *H04W 12/047* (2021.01)

(58) Field of Classification Search
None
See application file for complete search history.

(56) References Cited

U.S. PATENT DOCUMENTS

| | | |
|---|---|---|
| 5,987,338 A | 11/1999 | Gibbons et al. |
| 6,047,200 A | 4/2000 | Gibbons et al. |
| (Continued) | | |

FOREIGN PATENT DOCUMENTS

| | | |
|---|---|---|
| WO | 2016/201033 A1 | 12/2016 |

OTHER PUBLICATIONS

Doherty et al., "Dynamic Symmetric Key Provisioning Protocol", RFC 6063, Internet Engineering Task Force, Dec. 2010, 105 pages.

*Primary Examiner* — Michael W Chao
(74) *Attorney, Agent, or Firm* — Artegis Law Group, LLP

(57) ABSTRACT

Various embodiments disclose a method including detecting, by a first node in a mesh network while the first node is operating in a normal power mode, an outage event; in response to detecting the outage event, switching to operating the first node and a first memory of the first node in a low power mode, wherein the first memory is capable of switching between operating in the normal power mode and in the low power mode where an amount of power used by the first memory is reduced; and while operating the first node and the first memory in the low power mode: generating, by the first node, a first message; securing, by the first node using a key retrieved from the first memory, the first message; and sending, by the first node, the first message to a second node in the mesh network.

20 Claims, 5 Drawing Sheets

(51) Int. Cl.
    *H04L 41/28*       (2022.01)
    *H04W 12/047*     (2021.01)

(56)         References Cited

U.S. PATENT DOCUMENTS

| | | | |
|---|---|---|---|
| 7,127,573 B1 | 10/2006 | Strongin et al. | |
| 9,432,259 B1 | 8/2016 | Hutz et al. | |
| 9,439,145 B2 | 9/2016 | Van Greunen et al. | |
| 10,871,818 B1 * | 12/2020 | De La Cropte De Chanterac | G06F 1/325 |
| 11,934,814 B2 * | 3/2024 | Lei | G06F 8/36 |
| 12,185,092 B2 * | 12/2024 | Zhao | H04W 40/32 |
| 2002/0013872 A1 * | 1/2002 | Yamada | G06F 9/3881 |
| | | | 710/240 |
| 2002/0029354 A1 * | 3/2002 | Forehand | G11B 33/121 |
| | | | 713/340 |
| 2002/0073358 A1 * | 6/2002 | Atkinson | G06F 11/1004 |
| | | | 714/21 |
| 2002/0083368 A1 * | 6/2002 | Abe | G06F 1/30 |
| | | | 714/24 |
| 2002/0087908 A1 | 7/2002 | Dossey et al. | |
| 2002/0116588 A1 * | 8/2002 | Beckert | G06F 12/122 |
| | | | 711/100 |
| 2003/0191915 A1 * | 10/2003 | Saxena | G06F 1/3225 |
| | | | 711/E12.004 |
| 2003/0233583 A1 | 12/2003 | Carley | |
| 2004/0202161 A1 * | 10/2004 | Stachura | G06F 13/385 |
| | | | 370/389 |
| 2005/0038962 A1 * | 2/2005 | Lim | G06F 12/0806 |
| | | | 711/118 |
| 2005/0096102 A1 * | 5/2005 | Mock | H04W 52/265 |
| | | | 455/574 |
| 2005/0116814 A1 | 6/2005 | Rodgers et al. | |
| 2006/0274764 A1 | 12/2006 | Mah et al. | |
| 2007/0079161 A1 * | 4/2007 | Gupta | G06F 1/3293 |
| | | | 713/324 |
| 2007/0226522 A1 * | 9/2007 | Aleksic | G06F 1/3203 |
| | | | 713/300 |
| 2007/0283173 A1 | 12/2007 | Webb et al. | |
| 2008/0034234 A1 * | 2/2008 | Shimizu | G06F 1/3275 |
| | | | 713/320 |
| 2008/0045166 A1 * | 2/2008 | Koch | G06F 1/3203 |
| | | | 455/127.5 |
| 2009/0031072 A1 * | 1/2009 | Sartore | G06F 1/305 |
| | | | 711/E12.002 |
| 2009/0060192 A1 | 3/2009 | Budampati et al. | |
| 2010/0023752 A1 | 1/2010 | Barker et al. | |
| 2010/0061272 A1 * | 3/2010 | Veillette | H04W 40/005 |
| | | | 370/254 |
| 2010/0141762 A1 | 6/2010 | Siann et al. | |
| 2010/0202239 A1 | 8/2010 | Moshayedi et al. | |
| 2010/0238003 A1 | 9/2010 | Chan et al. | |
| 2010/0301769 A1 | 12/2010 | Chemel et al. | |
| 2012/0026726 A1 | 2/2012 | Recker et al. | |
| 2012/0151162 A1 | 6/2012 | Trantham et al. | |
| 2012/0182927 A1 | 7/2012 | Wiesner et al. | |
| 2012/0266002 A1 | 10/2012 | Kim | |
| 2013/0046967 A1 | 2/2013 | Fullerton et al. | |
| 2013/0275785 A1 | 10/2013 | Katori et al. | |
| 2013/0311809 A1 * | 11/2013 | Sood | H04L 49/90 |
| | | | 713/323 |
| 2013/0343202 A1 | 12/2013 | Huseth et al. | |
| 2015/0029808 A1 | 1/2015 | Allison et al. | |
| 2015/0089255 A1 * | 3/2015 | Jurski | G06F 1/329 |
| | | | 713/320 |
| 2015/0095010 A1 | 4/2015 | Brock et al. | |
| 2015/0160718 A1 * | 6/2015 | Cui | G06F 1/3203 |
| | | | 713/320 |
| 2015/0178500 A1 | 6/2015 | Pearson et al. | |
| 2015/0355699 A1 | 12/2015 | Castro-Leon et al. | |
| 2016/0021013 A1 | 1/2016 | Vasseur et al. | |
| 2016/0077579 A1 * | 3/2016 | Gulati | G06F 1/3296 |
| | | | 713/323 |
| 2016/0246355 A1 | 8/2016 | Dannenberg et al. | |
| 2017/0017587 A1 | 1/2017 | West et al. | |
| 2017/0060668 A1 | 3/2017 | Farhan et al. | |
| 2017/0070941 A1 | 3/2017 | Veillette | |
| 2017/0169640 A1 * | 6/2017 | Britt | G06F 21/35 |
| 2017/0171204 A1 | 6/2017 | Forood et al. | |
| 2017/0185139 A1 | 6/2017 | Zwerg et al. | |
| 2017/0315873 A1 | 11/2017 | Alcorn et al. | |
| 2018/0076662 A1 | 3/2018 | Maheshwari et al. | |
| 2018/0165215 A1 | 6/2018 | Kumar et al. | |
| 2018/0288694 A1 | 10/2018 | Gordon et al. | |
| 2019/0104134 A1 | 4/2019 | Lee et al. | |
| 2019/0205541 A1 | 7/2019 | Zimny et al. | |
| 2019/0215980 A1 | 7/2019 | Rhinehart et al. | |
| 2020/0103956 A1 | 4/2020 | Srinivas et al. | |
| 2020/0201418 A1 | 6/2020 | Richter et al. | |
| 2021/0065820 A1 | 3/2021 | Trivedi et al. | |
| 2022/0060450 A1 * | 2/2022 | Slovetskiy | H04L 67/142 |
| 2022/0413725 A1 | 12/2022 | Choi et al. | |
| 2025/0053222 A1 * | 2/2025 | Blodgett | G06F 1/3212 |
| 2025/0278504 A1 * | 9/2025 | Nix | H04W 12/06 |

* cited by examiner

| Key ID | Current MFG LG Key 302 | Neighbor1 Address 316 | Timestamp |
| Key ID | Next MFG LG Key 304 | Neighbor1 Address 316 | Timestamp |
| Key ID | Current CUST LG Key 306 | Neighbor2 Address 318 | Timestamp |
| Key ID | Next CUST LG Key 308 | Neighbor2 Address 318 | Timestamp |

314    320

| Key ID | Neighbor3 LG Key 310 | Neighbor3 Address 328 | Timestamp |
| Key ID | Neighbor4 LG Key 312 | Neighbor4 Address 330 | Timestamp |

322    326

SECURE MESSAGING FOR OUTAGE EVENTS

CROSS-REFERENCE TO RELATED APPLICATIONS

This application is a continuation of U.S. patent application titled, "Secure Messaging for Outage Events," filed on Dec. 16, 2020, and having Ser. No. 17/124,428. The subject matter of this related application is hereby incorporated by references.

BACKGROUND

Field of the Various Embodiments

The various embodiments relate generally to wireless network communications, and more specifically, to secure messaging for outage events.

Description of the Related Art

A wireless mesh network includes a plurality of nodes that are configured to communicate with and transmit data to one another using one or more communication protocols. In lieu of using a hierarchal topology, individual nodes within a wireless mesh network establish direct connections with other nodes within the network in order to efficiently route data to different locations in the network.

A node in the network can experience any of a number of outage events. One example of an outage event is a power outage, in which the node loses electrical power. Other examples of outage events include software and/or hardware bugs in the node, and tampering of the node (e.g., removal of a battery from the node). When a node experiences and detects an outage event, the node can shut itself down to forestall further harm to itself and/or the network.

A node that is shutting itself down can send one or more messages reporting its status and/or the outage event to a central location (e.g., to a control center or back office) before the node is completely shut down. The node can also receive and relay status reporting messages from neighboring nodes that are experiencing the same or a different outage event. A drawback of these conventional approaches is that when a node is shutting down, the resources available to the node to send and/or receive messages are very limited. When a node is shutting down, only a subset of the functionality of the node may be available. For example, certain components of the node may be inaccessible due to insufficient electrical power remaining in the node and/or to disablement by the node to prevent further damage and/or corruption. The loss of components resulting from the outage event negatively affects the ability of the node to securely send and/or receive messages to report the outage by, for example, denying access to storage where encryption/decryption and/or authentication keys are stored.

As the foregoing illustrates, what is needed in the art are more effective ways of transmitting and/or receiving secure messages in outage event.

SUMMARY

Various embodiments disclose a computer-implemented method for sending a message associated with an outage event. The method includes, at a first node in a network, receiving a key from a second node in the network, wherein the second node is adjacent to the first node; storing the key in a first memory, wherein the first memory is capable of operating in a low power mode; detecting an outage event; in response to detecting the outage event, operating a first processor in the low power mode; and via the first processor operating in the low power mode: generating a message, securing the message using the key, and sending the message to the second node.

Other embodiments include, without limitation, one or more non-transitory computer-readable media storing instructions for performing one or more aspects of the disclosed techniques, as well as a system for performing one or more aspects of the disclosed techniques.

At least one technical advantage and improvement of the disclosed techniques is that nodes in a network can securely send and/or receive messages in response to and during an outage event. Accordingly, nodes in the network can securely report and/or forward last-gasp messages reporting the outage event and associated node statuses to a location where administrators can review the reporting and take appropriate action. Another technical advantage and improvement of the disclosed techniques is that the nodes can securely send and/or receive last-gasp messages using less electrical power than in conventional techniques. These technical advantages provide one or more technological advancements over prior art approaches.

BRIEF DESCRIPTION OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

DETAILED DESCRIPTION

In the following description, numerous specific details are set forth to provide a more thorough understanding of the various embodiments. However, it will be apparent to one of skilled in the art that the inventive concepts may be practiced without one or more of these specific details.

System Overview

Figure 1:
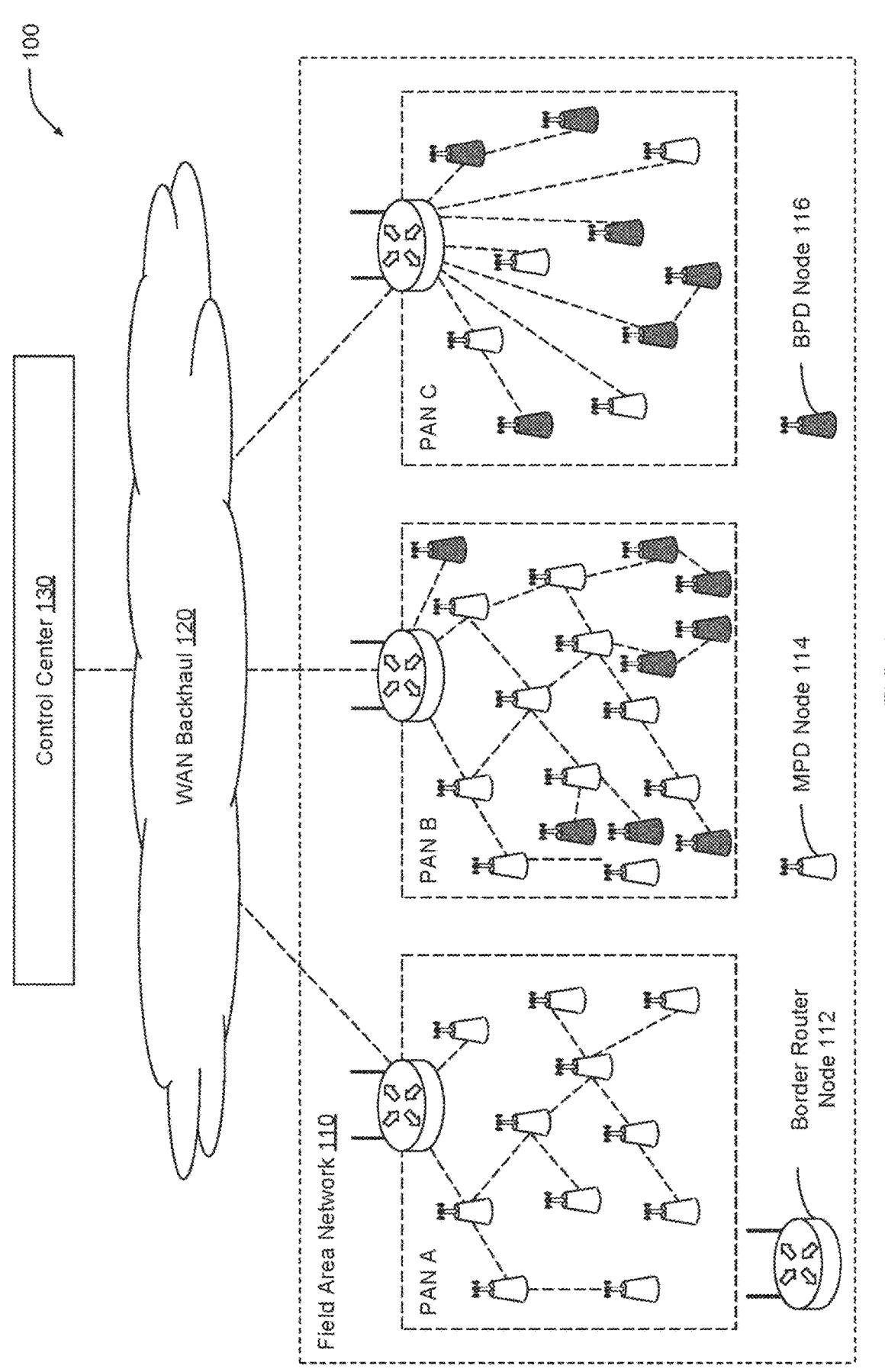
FIG. 1 illustrates a network system configured to implement one or more aspects of the various embodiments.

FIG. 1 illustrates a network system configured to implement one or more aspects of the various embodiments. As shown, network system 100 includes field area network (FAN) 110, wide area network (WAN) backhaul 120, and control center 130. FAN 110 is coupled to control center 130 via WAN backhaul 120. Control center 130 is configured to coordinate the operation of FAN 110.

FAN 110 includes personal area network (PANs) A, B, and C. PANs A and B are organized according to a mesh network topology, while PAN C is organized according to a star network topology. Each of PANs A, B, and C includes at least one border router node device 112 and one or more mains-powered device (MPD) node devices 114. PANs B and C further include one or more battery-powered device (BPD) node devices 116.

MPD node devices 114 draw power from an external power source, such as mains electricity or a power grid. MPD node devices 114 typically operate on a continuous basis without powering down for extended periods of time. BPD node devices 116 draw power from an internal power source, such as a battery or other local source (e.g., solar cell, etc.). BPD node devices 116 typically operate intermittently and, in some embodiments, may power down for extended periods of time in order to conserve battery power. MPD node devices 114 and/or BPD node devices 116 are configured to gather sensor data, process the sensor data, and communicate data processing results and/or other information to control center 130. Border router node devices 112 operate as access points that provide MPD node devices 114 and BPD node devices 116 with access to control center 130.

Any of border router node devices 112, MPD node devices 114, and/or BPD node devices 116 are configured to communicate directly with one or more adjacent node devices (also referred to as neighbors or neighbor node devices) via bi-directional communication links. In various embodiments, a given communication link may be wired or wireless links, although in practice, adjacent node devices of a given PAN exchange data with one another by transmitting data packets via wireless radio frequency (RF) communications. The various node types are configured to perform a technique, known in the art as "channel hopping," in order to periodically receive data packets on varying channels. As known in the art, a "channel" may correspond to a particular range of frequencies. In one embodiment, a node device may compute a current "receive" channel by evaluating a Jenkins hash function that is based on a total number of channels, the media access control (MAC) address of the node device, and/or other information associated with the node device.

In various embodiments, each node device within a given PAN may implement a discovery protocol to identify one or more adjacent node devices or "neighbors." In such instances, a node device that has identified an adjacent, neighboring node device may establish a bi-directional communication link with the neighboring node device. Each neighboring node device may update a respective neighbor table to include information concerning the other node device, including the MAC address of the other node device, as well as a received signal strength indication (RSSI) of the communication link established with that node device. In various embodiments, the neighbor table may include information about one or more communication modes that the neighbor mode is capable of supporting, such as the operating parameters (e.g., data rates, modulation scheme, channel spacing, frequencies supported, channel schedule, etc.).

Node devices may compute the channel hopping sequences of adjacent node devices in order to facilitate successful transmission of data packets to such node devices. In embodiments where node devices implement the Jenkins hash function, a node device may compute a "current receive" channel of an adjacent node device using the total number of channels, the MAC address of the adjacent node device, and/or a time slot number assigned to a current time slot of the adjacent node device.

Any of the node devices discussed above may operate as a source node device, an intermediate node device, or a destination node device for the transmission of data packets. In some embodiments, a given source node device may generate a data packet and then transmit the data packet to a destination node device via any number of intermediate node devices (in mesh network topologies). In such instances, the data packet may indicate a destination for the packet and/or a particular sequence of intermediate node devices to traverse in order to reach the destination node device. In some embodiments, each intermediate node device may include a forwarding database indicating various network routes and cost metrics associated with each route.

Node devices 112, 114, 116 transmit data packets across a given PAN and across WAN backhaul 120 to control center 130. Similarly, control center 130 transmits data packets across WAN backhaul 120 and across any given PAN to a particular node device 112, 114, 116 included therein. As a general matter, numerous routes may exist which traverse any of PANs A, B, and C and include any number of intermediate node devices, thereby allowing any given node device or other component within network system 100 to communicate with any other node device or component included therein.

Control center 130 includes one or more server machines (not shown) configured to operate as sources for, and/or destinations of, data packets that traverse within network system 100. In various embodiments, the server machines may query node devices within network system 100 to obtain various data, including raw and/or processed sensor data, power consumption data, node/network throughput data, status information, and so forth. The server machines may also transmit commands and/or program instructions to any node device 112, 114, 116 within network system 100 to cause those node devices to perform various operations. In one embodiment, each server machine is a computing device configured to execute, via a processor, a software application stored in a memory to perform various network management operations.

In various embodiments, node devices 112, 114, 116 can experience any of a number of outage events. Examples of outage events include, without limitation, a loss of electrical power from the power source (e.g., outage of or disconnection from the external or internal power source), detection of a software or hardware bug at the node device, or tampering of the node device (e.g., removal of the battery). When a node device experiences an outage event, the node device can shut down. A node device that is shutting down can send one or more messages (referred to herein as "last-gasp message(s)"), via one or more other node devices, to control center 130 before the shutdown is complete, in order to report the outage event and/or the status of the node device to control center 130. A node device can also receive and forward last-gasp messages sent from other node devices toward control center 130 that are shutting down due to the outage event. Last-gasp messages can be secured (e.g., encrypted and/or authenticated) messages. Capabilities of node devices and associated techniques for sending and receiving last-gasp messages are described in further detail below.

Figure 2:
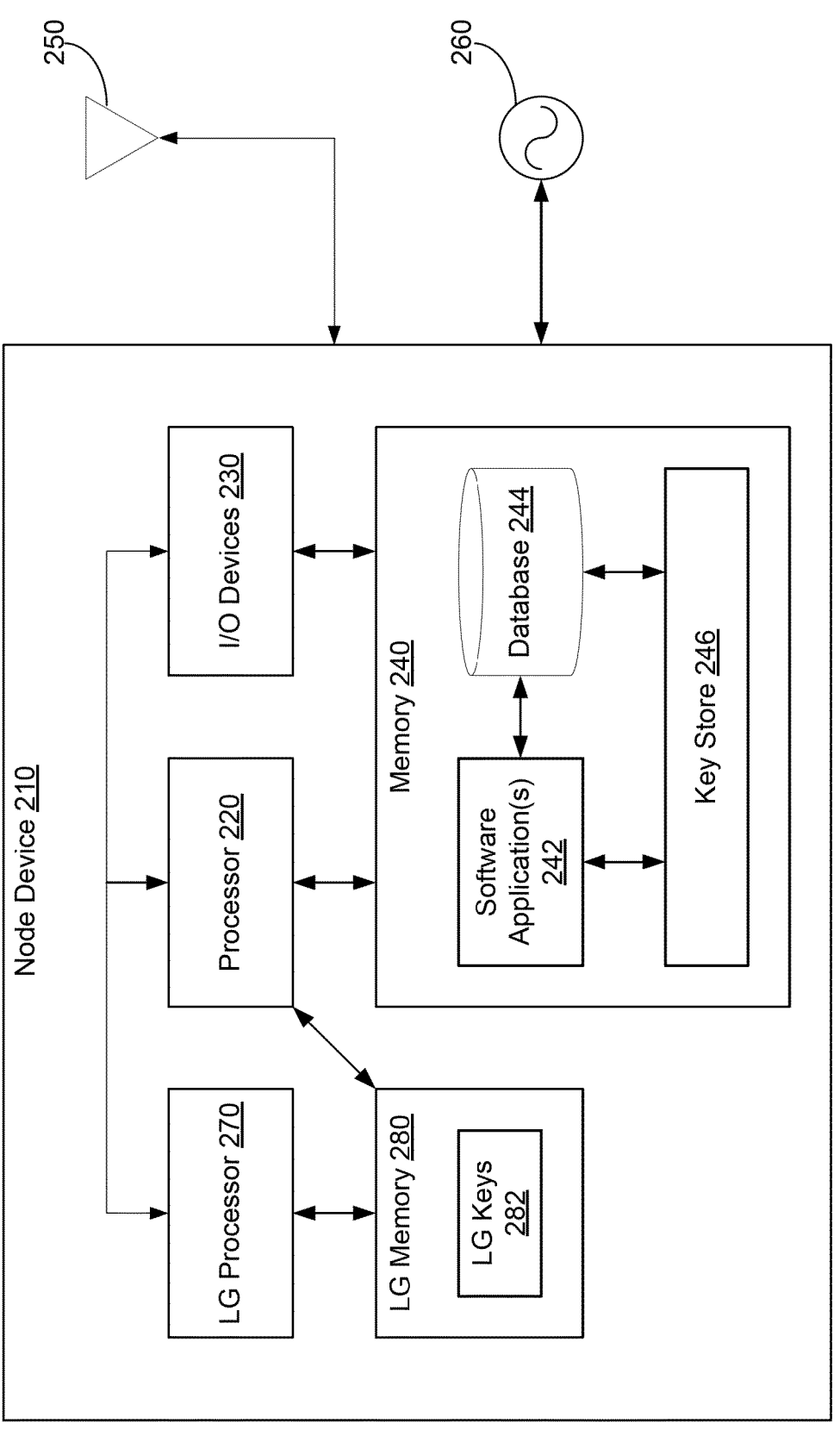
FIG. 2 illustrates a node device configured to transmit and receive data within the network system of FIG. 1, according to various embodiments.

In various embodiments, node devices 112, 114, 116 may likewise include computing device hardware configured to perform processing operations and execute program code. Each node device may further include various analog-to-digital (A/D) converters, digital-to-analog (D/A) converters, digital signal processors (DSPs), harmonic oscillators, transceivers, and/or any other components generally associated with RF-based communication hardware. FIG. 2 illustrates an exemplary node device that may operate within the network system 100.

FIG. 2 illustrates a node device configured to transmit and receive data within the network system 100 of FIG. 1, according to various embodiments. As shown, node device 210 is coupled to transceiver 250 and oscillator 260. Node device 210 includes processor 220, input/output devices 230, and memory 240. Memory 240 includes one or more applications (e.g., software application 242) that communicate with database 244. Node device 210 can further include a last-gasp (LG) processor 270 and a LG memory 280.

Node device 210 coordinates the operations of node device 210. Transceiver 250 is configured to transmit and/or receive data packets and/or other messages across network system 100 using a range of channels and power levels. Oscillator 260 provides one or more oscillation signals, according to which, in some embodiments, node device 210 may schedule the transmission and reception of data packets. In some embodiments, node device 210 may be used to implement any of border router node devices 112, MPD node devices 114, and/or BPD node devices 116 of FIG. 1.

Node device 210 includes a processor 220, input/output (I/O) devices 230, and memory 240, coupled together. In various embodiments, processor 220 may include any hardware configured to process data and execute software applications. Processor 220 may include a real-time clock (RTC) (not shown) according to which processor 220 maintains an estimate of the current time. The estimate of the current time may be expressed in Universal Coordinated Time (UTC), although any other standard of time measurement can also be used. I/O devices 230 include devices configured to receive input, devices configured to provide output, and devices configured to both receive input and provide output. Memory 240 may be implemented by any technically-feasible computer-readable storage medium.

Memory 240 includes one or more software applications 242 and database 244, coupled together. The one or more software applications includes program code that, when executed by processor 220, may performs any of the node-oriented computing functionality described herein. The one or more software applications 242 may also interface with transceiver 250 to coordinate the transmission and/or reception of data packets and/or other messages across network system 100, where the transmission and/or reception is based on timing signals generated by oscillator 260. In various embodiments, memory 240 may be configured to store protocols used in communication modes, equations and/or algorithms for identifying metric values, constants, data rate information, and other data used in identifying metric values, etc. Memory 240 can also include a key store 246 where keys for encryption, decryption, and/or authentication of communications (e.g., messages) between node devices can be stored.

In operation, software application(s) 242 can implement various techniques to optimize communications with one or more linked node devices, such as a neighboring node device. In various embodiments, node device 210 may be configured to, using a plurality of different communication modes, transmit data messages to the linked node device and/or receive data messages from the linked node device by selecting a common communication mode that is supported by node device 210 and the linked node device. More generally, node device 210 can be configured for multi-mode communications. Node device 210 can communicate with a linked node or with control center 130 using any of a plurality of modes. The particular mode used for a given transmission depends on the particular circumstances of the transmission (e.g., the type of data message, the intended recipients of the data message, etc.). Examples of the modes include, without limitation, unicast, broadcast, and multicast.

In various embodiments, processor 220 can generate one or more encryption/decryption and/or authentication keys for communications with node devices adjacent to the node device 210. For each adjacent node device, processor 220 can generate a key for messages to be sent by the adjacent node device to node device 210. Node device 210 can send to the adjacent node device the key generated for the adjacent node device by processor 220, and can receive a key generated by the adjacent node device. Node device 210 can send encrypted and/or authenticated messages to the adjacent node device using the key received from the adjacent node device. The adjacent node device can send encrypted and/or authenticated messages to node device 210 using the key generated by processor 220, processor 220 can decrypt and/or authenticate the messages using that key or a corresponding asymmetric key. Processor 220 can generate keys in accordance with instructions programmed in hardware (e.g., programmed into the processor 220) and/or software (e.g., in a software application 242). Node device 210 can store keys generated by processor 220 and keys received from adjacent node devices in memory 240 (e.g., in key store 246).

In various embodiments, node device 210 can further include a last-gasp (LG) processor 270 and a LG memory 280 that are separate from processor 220 and memory 240, respectively. LG processor 270 and LG memory 280 are configured to operate in a low power mode (e.g., when node device 210 is shutting down and power in node device 210 is reduced) in conjunction with I/O devices 230, transceiver 250, and oscillator 260. LG processor 270 can be configured (e.g., programmed) with a limited instruction set for performing specific functions (e.g., functions associated with sending and/or receiving last-gasp messages, shut down processes, and/or the like). In some embodiments, LG memory 280 has a significantly smaller capacity than memory 240 and/or key store 246, which can facilitate operation of LG memory 280 in a low power mode. As a non-limiting example, memory 240 may have a size of 16 MB and LG memory 280 may have a size of 4 KB. A set of LG keys 282 for securing last-gasp messages can be stored in LG memory 280. LG keys 282, further described below, includes keys generated by node device 210 and keys received from one or more adjacent node devices. LG processor 270 may be implemented by any technically feasible processor unit that is capable of operating in low power mode. Examples of LG processor 270 include, without limitation, a digital signal processor, a system-on-a-chip, a field-programmable gate array (FPGA), an application-specific integrated circuit (ASIC), and/or the like. LG memory 280 may be implemented by any technically feasible computer-readable storage medium (e.g., volatile and/or non-volatile memory) capable of operation in low power mode. Examples of LG memory 280 include, without limitation, dynamic random access memory (D-RAM). In some embodiments, in lieu of a separate LG processor 270, processor 220 can operate in a low power mode and includes instructions for performing functions associated with functions associated with sending and/or receiving last-gasp messages. In some embodiments, in lieu of a separate LG memory 280, at least a portion of memory 240 can operate in a low power mode, and LG keys 282 can be stored in, and retrieved from, that portion of memory 240. For ease of understanding, processor 220 and memory 240 may be referred to herein as "main processor" 220 and "main memory" 240, respectively.

Secure Messaging for Outage Events

In operation, prior to an outage event, a node device 210 can establish bi-directional communication links with one or more adjacent node devices in network system 100. In conjunction with establishing a communication link with a given adjacent node device, node device 210 can determine whether the adjacent node device has a first trust level or a second trust level. In some embodiments, the first trust level corresponds to a "manufacturer trust" level, where the adjacent node device does not yet have credentials associated with the owner of network system 100 (e.g., at first installation of the adjacent node device out-of-the-box), and the second trust level corresponds to a "customer trust" (as in a customer (e.g., owner of network system 100) that acquired, and now owns and deploys, the node device) level, where the adjacent node device has credentials associated with the network owner (e.g., after the adjacent node device has been installed and onboarded into network system 100). A "customer trust" level can also be referred to as an "owner trust" level.

For a given adjacent node device with whom a communication link has been established, node device 210 can generate a key (e.g., using a cryptographic random number generator). The key can be sent to the adjacent node device via the communication link; the adjacent node device can use that key to send secure messages to node device 210. Node device 210 can generate a key for the adjacent node based on the trust level. If the adjacent node device has the first trust level, node device 210 generates a key associated with the first trust level for the adjacent node device. If the adjacent node device has the second trust level, node device 210 generates a key associated with the second trust level for the adjacent node device. If the adjacent node device upgrades from the first trust level to the second trust level, node device 210 can generate a new key associated with the second trust level for the adjacent node device. Node device 210 can store the generated key in memory 240. In some embodiments, a node device 210 can send a key to an adjacent node device in a message that includes a timestamp associated with the key, a recipient (the adjacent node device) address, the key, and a key ID associated with the key. In some embodiments, the message for sending the key to the adjacent node device is formatted according to the ISO/IEC 11770-2 Key Establishment Mechanism 3 protocol.

Further, node device 210 can receive a key from the adjacent node device. The adjacent node device generates a key associated with the trust level of node device 210 and sends that key to node device 210. Node device 210 can store keys generated by node device 210 for an adjacent node device and keys received from adjacent node devices in memory 240 (e.g., inkey store 246). In various embodiments, node device 210 stores a set of generated key(s) and received key(s) for each adjacent node device.

In various embodiments, a key is associated with a key identifier (or "key ID"). Node device 210 can generate a key ID in conjunction with generating the corresponding key. When node device 210 secures a message with a key, the key ID is included along with the message (e.g., in a header or a payload of the message). When a node device 210 receives a message from an adjacent node device, node device 210 compares the key ID included with the message to the key ID of the generated key associated with the adjacent node device. If the key IDs do not match, then node device 210 can disregard the message as invalid. If the key IDs match, then node device 210 can proceed to decrypt and/or authenticate the message using the generated key identified by the key ID. In some embodiments, key IDs are unique with respect to the adjacent node device. In some other embodiments, key IDs are unique with respect to the network system 100.

In some embodiments, node device 210 can generate a "current" key and a "next" key for a given adjacent node device. The current key would be sent to the adjacent node device for current use. The next key would be sent to the adjacent node device when the current key needs replacing (e.g., when the adjacent node device disappeared from and reappeared in the network system 100, when a key update time interval has elapsed), and becomes the new current key. Node device 210 can then generate a new next key. Node device 210 can store the current and the next key in memory 240.

In various embodiments, node device 210 can select a subset of adjacent node devices as designated recipients for last-gasp messages. This last-gasp subset of adjacent node devices can include any number of adjacent node devices, up to the actual number of adjacent node devices. In some embodiments, the number of adjacent node devices in the last-gasp subset is relatively small (e.g., 1-3) relative to the actual number of adjacent node devices. In some embodiments, the number of adjacent node devices to be selected for the last-gasp subset can be predefined. Node device 210 can select one or more adjacent node devices for the last-gasp subset based on one or more criteria, including but not limited to: that the adjacent node device has a path within network system 100 to control center 130 (as opposed to no path to control center 130), that the adjacent node device has the second trust level (customer trust level) (as opposed to having the first trust level), that the adjacent node device has a battery backup (as opposed to lacking a battery backup), and a lower link cost associated with transmitting messages to control center 130 via the adjacent node device (as opposed to a higher link cost associated with transmitting to control center 130 via another adjacent node). Similarly, adjacent node devices can select node device for their respective last-gasp subsets.

For the last-gasp subset of adjacent node devices, node device 210 stores keys generated for and/or received from those adjacent node devices as LG keys 282 in LG memory 280 (or in a portion of memory 240 capable of operating in low power mode). LG keys 282 can be a duplicate of one or more keys stored in key store 246 (e.g., keys are generated and/or received and stored in both memory 240 and LG memory 280). In some embodiments, LG keys 282 are a subset of the keys stored in key store 246. By storing LG keys 282 in LG memory 280 or in a low-power-capable portion of memory 240, LG keys 282 are made accessible for use in sending and/or receiving last-gasp messages in response to an outage event.

Figure 3:
FIG. 3 is a diagram illustrating example last-gasp keys stored in a last-gasp memory, according to various embodiments.

FIG. 3 is a diagram illustrating example last-gasp keys 282 stored in a last-gasp memory 280, according to various embodiments. LG keys 282 stored at a node device 210 can include keys generated for the adjacent node devices in the last-gasp subset of adjacent node devices, and can further include keys received from adjacent node devices in that last-gasp subset. As shown, LG keys 282 include keys generated for two adjacent node devices "Neighbor1" and "Neighbor2", one of which (Neighbor1) has the manufacturer trust level and the other (Neighbor2) has the customer trust level. LG keys 282 also includes keys received from adjacent node devices "Neighbor3" and "Neighbor4." It should be appreciated that LG keys 282 can have more or less sets of keys associated with more or less selected adjacent node devices, depending on the particulars of the last-gasp subset.

As shown, LG keys 282 includes a current MFG LG key 302 and next MFG LG key 304 generated for the adjacent node device "Neighbor1" that has the manufacturer trust level. MFG LG keys 302 and 304 have respective key IDs 314 and respective timestamps 320. MFG LG keys 302 and 304 are both associated with the address (e.g., IP address, MAC address) 316 of Neighbor1. LG keys 282 also includes a current CUST LG key 306 and next CUST LG key 308 generated for the adjacent node device "Neighbor2" that has the customer trust level. CUST LG keys 306 and 308 have respective key IDs 314 and respective timestamps 320. CUST LG keys 306 and 308 are both associated with the address (e.g., IP address, MAC address) 318 of Neighbor2.

As shown, LG keys 282 further includes LG key 310 received from Neighbor3 and LG key 312 received from Neighbor4. LG keys 310 and 312 have respective key IDs 322 and respective timestamps 326. LG key 310 is associated with the address 328 of Neighbor3, and LG key 312 is associated with the address 330 of Neighbor4.

In operation, when node device 210 detects an outage event (e.g., experiences a power outage, etc.), LG processor 270 can activate and execute instructions associated with sending and/or receiving last-gasp messages. For example, LG processor 270 can execute instructions to send a last-gasp message to Neighbor3 and/or Neighbor4. For a last-gasp message to be sent to Neighbor3, LG processor retrieves Neighbor3 LG key 310 from LG keys 282 and uses LG key 310 to encrypt and/or authenticate the last-gasp message to be sent to Neighbor3. For a last-gasp message to be sent to Neighbor4, LG processor retrieves Neighbor4 LG key 312 from LG keys 282 and uses LG key 312 to encrypt and/or authenticate the last-gasp message to be sent to Neighbor4.

When node device 210 receives a last-gasp message from adjacent node device Neighbor1, LG processor compares a key ID included in the last-gasp message to key ID 314 of current MGF LG key 302, associated with Neighbor1, in LG keys 282 or key store 246. If the read key ID matches the key ID 314 of LG key 302, then LG processor 270 can proceed with decrypting and/or authenticating the last-gasp message using LG key 302. If the key IDs do not match, the message can be disregarded. When node device 210 receives a last-gasp message from adjacent node device Neighbor2, LG processor compares a key ID included in the last-gasp message to key ID 314 of current CUST LG key 306, associated with Neighbor2, in LG keys 282 or key store 246. If the read key ID matches the key ID 314 of LG key 306, then LG processor 270 can proceed with decrypting and/or authenticating the last-gasp message using LG key 306. If the key IDs do not match, the message can be disregarded. If node device 210 is experiencing an outage event when the last-gasp message is received, node device 210 (e.g., LG processor 270) can retrieve LG key 302 or 306, and associated key IDs, from LG keys 282. If node device 210 is operating normally and not experiencing an outage event when the last-gasp message is received, node device 210 (e.g., processor 220) can retrieve LG key 302 or 306, and associated key IDs, from key store 246.

After the message is decrypted and/or authenticated, LG processor 270 can forward (e.g., relay) the message by encrypting and/or authenticating the message using, depending on whether the adjacent node device Neighbor3 or Neighbor4 that is the forward recipient, LG key 310 or 312, and then sending the encrypted and/or authenticated message to the forward recipient. In some embodiments, LG processor 270 can forward the message to both Neighbor3 and Neighbor4, in which case the respective messages are encrypted and/or authenticated using LG keys 310 and 312, respectively. If node device 210 is experiencing an outage event when the last-gasp message is received, node device 210 (e.g., LG processor 270) can retrieve LG key 310 or 312, and associated key IDs, from LG keys 282. If node device 210 is operating normally and not experiencing an outage event when the last-gasp message is received, node device 210 (e.g., processor 220) can retrieve LG key 310 or 312, and associated key IDs, from key store 246.

It should be appreciated that, while as shown the generated LG keys 302, 304, 306, and 308, and received LG keys 310 and 312, are associated with different sets of adjacent node devices, in some embodiments the received keys are received from the same set of neighbors for which the generated keys are generated.

In some embodiments, a node device 210 can track a number of security-related attributes that can be included in last-gasp messages. For example, node device 210 can generate a reboot counter, which can be incremented with each outage event. When node device 210 restarts after an outage event, node device 210 can increment the reboot counter. Node device 210 can also generate a sequence number, which is unique for each unique reboot counter. Node device 210 can send the reboot counter and sequence number to adjacent node devices with which node device 210 re-establish communication links following the reboot. When sending a last-gasp message, node device 210 includes the reboot counter and sequence number of node device 210. When node device 210 receives a last-gasp message from an adjacent node device, in addition to checking the key ID, node device 210 (e.g., LG processor 270) also checks the reboot counter and sequence number included in the last-gasp message. If the reboot counter is not the same as what was last received from the adjacent node device and/or the sequence number is less than what was last received from the adjacent node device, then the message can be considered invalid. Additionally and/or alternatively, the last-gasp message can include a timestamp that can also be checked to validate the last-gasp message. By checking the reboot counter, sequence number, and/or timestamp of the last-gasp message in addition to the key ID included in the last-gasp message, node device 210 can check whether the last-gasp message is valid. If the message is valid, node device 210 can forward the message. If the message is invalid, node device 210 can disregard it.

Figure 4:
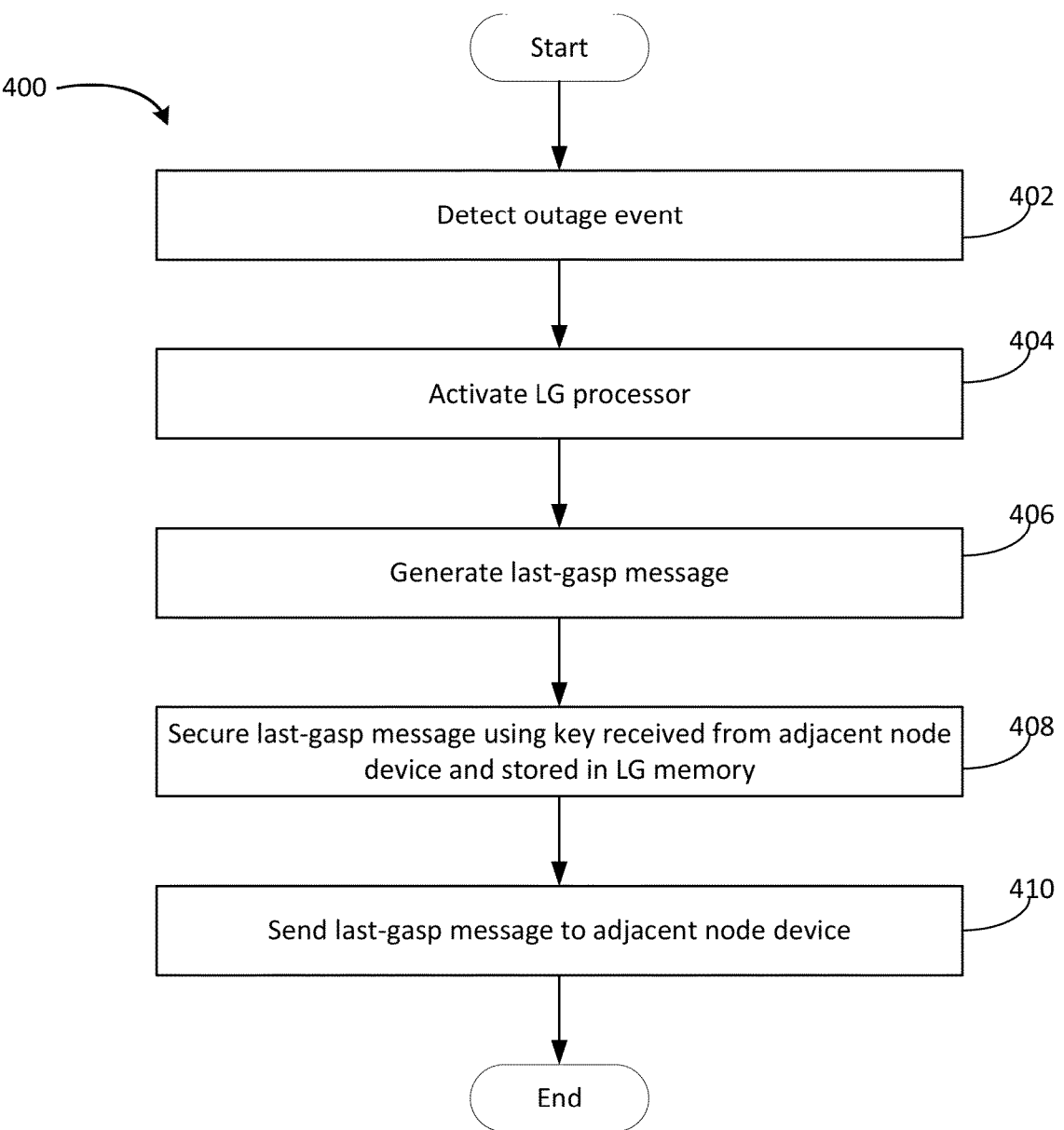
FIG. 4 is a flow diagram of method steps for sending a secure message associated with an outage event, according to various embodiments.

FIG. 4 is a flow diagram of method steps for sending a secure message associated with an outage event, according to various embodiments. Although the method steps are described with respect to the systems of FIGS. 1-3, persons skilled in the art will understand that any system configured to perform the method steps, in any order, falls within the scope of the various embodiments.

As shown, a method 400 begins at step 402, where node device 210 detects an outage event. For example, node device 210 can detect a loss of power due to a power outage, a hardware and/or software defect, and/or tampering of the node device 210.

At step 404, node device 210 activates LG processor 270. In response to detecting the outage event, LG processor 270 activates and begins operating, such as by executing instructions and/or the like.

At step 406, node device 210 generates a last-gasp message. LG processor 270 generates a last-gasp message, to be sent via one or more adjacent node devices, that reports the outage event and/or the status of node device 210 to, for example, control center 130. The last-gasp message includes a key ID of a LG key received from the adjacent node device that will receive the message (e.g., the key ID of LG key 310 if adjacent node device Neighbor3 will be the recipient). If the message is to be sent to multiple adjacent node devices, then multiple messages, each including respective key IDs, can be generated. The generated message can be an original last-gasp message originating from node device 210 or a forward of a last-gasp message received from an adjacent node device.

At step 408, node device 210 secures the last-gasp message using a LG key received from an adjacent node device (for the last-gasp message) and stored in LG memory 280. LG processor 270 retrieves, from LG keys 282 stored in LG memory 280, a key received from the adjacent node device that will be the recipient of the last-gasp message (e.g., LG key 310 if adjacent node device Neighbor3 will be the recipient). LG processor 270 proceeds to secure (e.g., encrypt and/or authenticate) the message using that retrieved LG key.

At step 410, node device 210 sends the last-gasp message to the adjacent node device. LG processor 270, in conjunction with transceiver 250 and optionally oscillator 260, sends the last-gasp message to the adjacent node device. Then method 400 ends.

Figure 5:
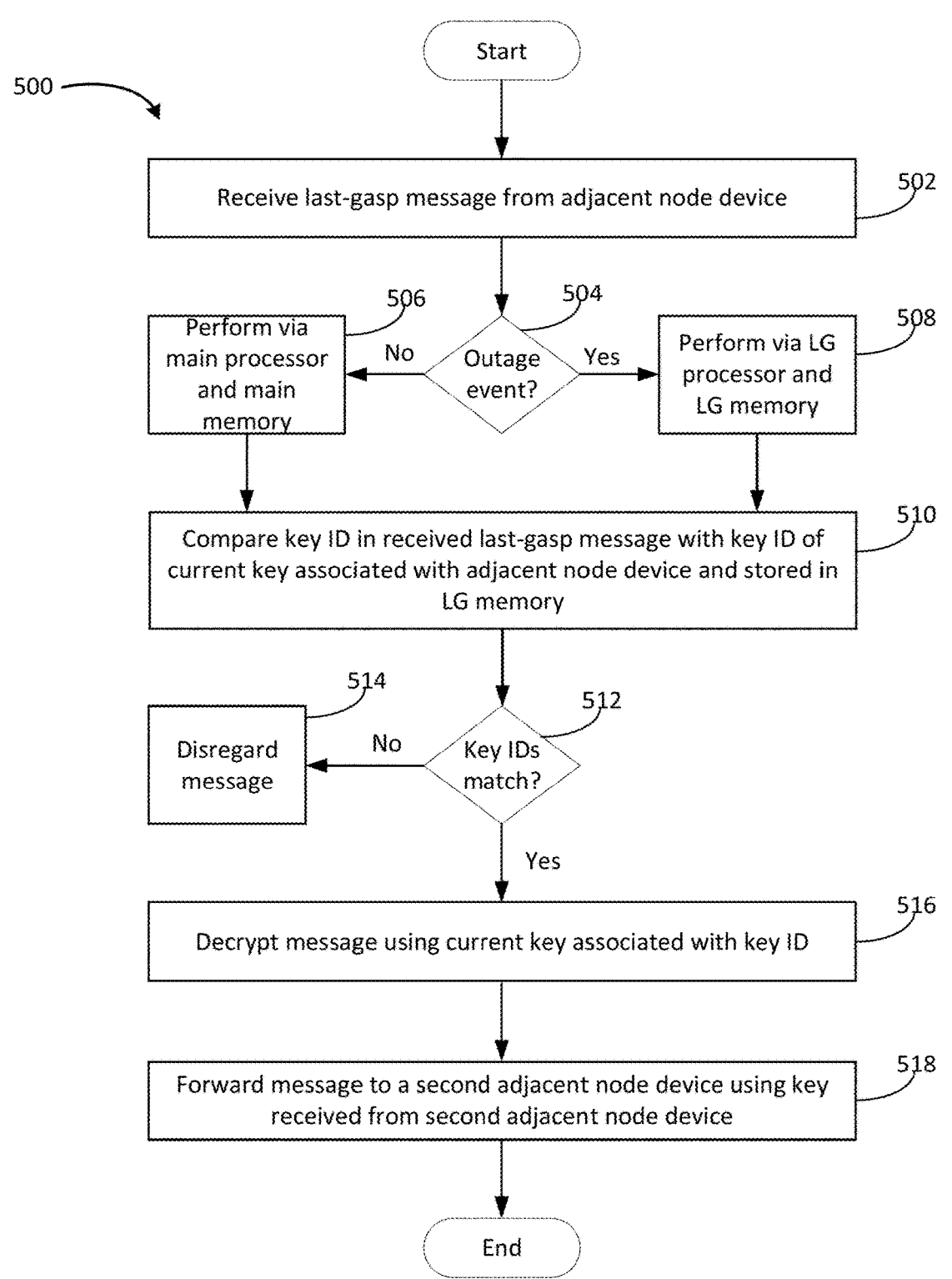
FIG. 5 is a flow diagram of method steps for receiving a secure message associated with an outage event, according to various embodiments.

FIG. 5 is a flow diagram of method steps for receiving a secure message associated with an outage event, according to various embodiments. Although the method steps are described with respect to the systems of FIGS. 1-3, persons skilled in the art will understand that any system configured to perform the method steps, in any order, falls within the scope of the various embodiments.

As shown, a method 500 begins at step 502, where node device 210 receives a last-gasp message from an adjacent node device. The last-gasp message may originate from the adjacent node device (e.g., the adjacent node device experienced an outage event and is sending the last-gasp message in response to the outage event) or could be forwarded by the adjacent node device to node device 210.

At step 504, node device 210 detects whether an outage event is occurring at the node device 210. If node device 210 detects no outage event at node device 210, then method 500 proceeds to step 506, where node device 210 performs the succeeding steps in method 500, via main processor 220 and main memory 240. Method 500 then proceeds to step 510.

If node device 210 detects an outage event at node device 210, then method 500 proceeds to step 508, where node device 210 performs the succeeding steps in method 500, via LG processor 270 and LG memory 280 (or via main processor 220 and main memory 240 in a low-power mode). Method 500 then proceeds to step 510.

At step 510, node device 210 compares the key ID included in the received last-gasp message with a key ID of a current key associated with the adjacent node device and stored in main memory 240 or LG memory 280. If node device 210 is operating via main processor 220 and main memory 240, main processor 220 retrieves, from key store 246 in main memory 240, a key ID of a current key generated for the adjacent node device from which the last-gasp message is received. If node device 210 is operating via LG processor 270 and LG memory 280, LG processor 270 retrieves, from LG keys 282 in LG memory 280, the key ID of the current key generated for the adjacent node device from which the last-gasp message is received. Main processor 220 or LG processor 270 then compares a key ID included in the last-gasp message with the key ID of the current key generated for the adjacent node device.

At step 512, node device 210 (e.g., main processor 220 or LG processor 270) determines, based on the comparing, whether the key IDs match to determine whether the received last-gasp message is valid. In some embodiments, node device 210 performs additional validation checks on the last-gasp message, in addition to checking whether the key IDs match. The other validation checks can include, for example, checking the timestamp, reboot counter, and/or sequence number of the last-gasp message. If node device 210 determines that the key IDs do not match, then method 500 proceeds to step 514, where node device 210 disregards the last-gasp message. If the key IDs do not match, then the last-gasp message is considered to be invalid, and accordingly node device 210 can disregard it.

If node device 210 determines that the key IDs match, then method 500 proceeds to step 516, where the last-gasp message is decrypted and/or authenticated using the current key. If node device 210 is operating via main processor 220 and main memory 240, main processor 220 retrieves the key having the key ID from key store 246 in main memory 240, and proceeds to decrypt and/or authenticate the last-gasp message using that key. If node device 210 is operating via LG processor 270 and LG memory 280, LG processor 270 retrieves the key having the key ID from LG keys 282 in LG memory 280, and proceeds to decrypt and/or authenticate the last-gasp message using that key.

At step 518, node device 210 forwards the message to a second adjacent node device using a key received from the second adjacent node device. In a manner similar to steps 406-410 of method 400 described above, main processor 220 or LG processor 270 sends (e.g., forwards) the message using a key associated with the second adjacent node device. The key was received from the second adjacent node device and stored in key store 246 and LG keys 282. If node device 210 is operating via main processor 220, main processor 220 retrieves the key from key store 246, generates the forward message, secures the message using the key, and sends the message to the second adjacent node device. If node device 210 is operating via LG processor 270, LG processor 270 retrieves the key from key store 246, generates the forward message, secures the message using the key, and sends the message to the second adjacent node device. Then method 500 ends.

In sum, a node in a network is configured to store encryption/decryption and/or authentication keys for use in outage events in a separate memory capable of low power operation, and to use those keys when sending and/or receiving messages associated with an outage event. A given node can select a number of neighboring nodes for sending last-gasp messages associated with outage events. The given node generates and exchanges keys with those neighbors, and stores those keys in a memory, separate from main memory, capable of low power operation. When an outage event occurs at the given node, the given node sends a secure message to one or more of the selected neighbors, using one or more of the keys received the selected neighbors and stored in the separate memory. When the given node receives a message associated with an outage event from a neighbor, the given node processes the message using a key generated by the given node and used by the neighbor to secure the message. The given node then can forward the message to a neighbor using a key received from the neighbor.

At least one technical advantage and improvement of the disclosed techniques is that nodes in a network can securely send and/or receive messages in response to and during an outage event. Accordingly, nodes in the network can securely report and/or forward last-gasp messages reporting the outage event and associated node statuses to a location where administrators can review the reporting and take appropriate action. Another technical advantage and improvement of the disclosed techniques is that the nodes can securely send and/or receive last-gasp messages using less electrical power than in conventional techniques. Accordingly, nodes in the network can securely send, receive, and/or forward last-gasp messages in the face of loss of electrical power or reduced electrical power. These technical advantages provide one or more technological advancements over prior art approaches.

1. In some embodiments, a computer-implemented method for sending a message associated with an outage event comprises, at a first node in a network: receiving a key from a second node in the network, wherein the second node is adjacent to the first node; storing the key in a first memory, wherein the first memory is capable of operating in a low power mode; detecting an outage event; in response to detecting the outage event, operating a first processor in the low power mode; and via the first processor operating in the low power mode: generating a message; securing the message using the key; and sending the message to the second node.

2. The method of clause 1, wherein the first node comprises the first processor and a second processor distinct from the first processor, and wherein the second processor is a main processor of the first node.

3. The method of clauses 1 or 2, wherein the first processor is a main processor of the first node.

4. The method of any of clauses 1-3, wherein the first node comprises the first memory and a second memory distinct from the first memory, wherein the second memory is a main memory of the first node.

5. The method of any of clauses 1-4, wherein the first memory is a main memory of the first node; and the method further comprises, in response to detecting the outage event, operating the first memory in the low power mode.

6. The method of any of clauses 1-5, wherein securing the message using the key comprises retrieving the key from the first memory via the first processor operating in the low power mode.

7. The method of any of clauses 1-6, wherein the key is generated by the second node.

8. The method of any of clauses 1-7, wherein the message comprises a key identifier of the key.

9. The method of any of clauses 1-8, wherein the network comprises a plurality of nodes adjacent to the first node, wherein the plurality of nodes includes the second node, and wherein the method further comprises selecting a subset of the plurality of nodes adjacent to the first node as designated recipients of outage event messages sent by the first node, wherein the subset includes the second node.

10. The method of any of clauses 1-9, further comprising receiving a second message from a third node in the network adjacent to the first node; validating the second message; and forwarding the second message to the second node, wherein the forwarded second message is secured using the key.

11. The method of any of clauses 1-10, wherein the receiving the second message, validating, and forwarding steps are performed by the first processor operating in the low power mode in accordance with a determination that an outage event is detected.

12. The method of any of clauses 1-11, wherein the receiving the second message, validating, and forwarding steps are performed by a main processor at the first node operating in a normal mode in accordance with a determination that an outage event is not detected.

13. In some embodiments, one or more non-transitory computer-readable media at a first node in a network, the one or more computer-readable storage media store program instructions that, when executed by one or more processors at the first node, cause the one or more processors at the first node to perform the steps of receiving a key from a second node in the network, wherein the second node is adjacent to the first node; storing the key in a first memory, wherein the first memory is capable of operating in a low power mode; detecting an outage event; in response to detecting the outage event, operating a first processor included in the one or more processors in the low power mode; and via the first processor operating in the low power mode: generating a message; securing the message using the key; and sending the message to the second node.

14. The one or more non-transitory computer-readable storage media of clause 13, wherein the first node comprises the first processor and a second processor distinct from the first processor, and wherein the second processor is a main processor of the first node.

15. The one or more non-transitory computer-readable storage media of clauses 13 or 14, wherein the first node comprises the first memory and a second memory distinct from the first memory, wherein the second memory is a main memory of the first node.

16. The one or more non-transitory computer-readable storage media of any of clauses 13-15, wherein securing the message using the key comprises retrieving the key from the first memory via the first processor operating in the low power mode.

17. The one or more non-transitory computer-readable storage media of any of clauses 13-16, wherein the steps further comprise receiving a second message from a third node in the network adjacent to the first node; validating the second message; and forwarding the second message to the second node, wherein the forwarded second message is secured using the key.

18. The one or more non-transitory computer-readable storage media of any of clauses 13-17, wherein the network comprises a plurality of nodes adjacent to the first node, wherein the plurality of nodes includes the second node, and wherein the steps further comprise selecting a subset of the plurality of nodes adjacent to the first node as designated recipients of outage event messages sent by the first node, wherein the subset includes the second node.

19. The one or more non-transitory computer-readable storage media of any of clauses 13-18, wherein the steps further comprise for each node in the selected subset: generating a second key based on a trust level associated with the node; and sending the generated second key to the node.

20. In some embodiments, a system in a wireless mesh network comprises a plurality of nodes included in a wireless mesh network; a first node included in the plurality of nodes; a second node included in the plurality of nodes and adjacent to the first node, the second node configured to perform the steps of receiving a key from the first node; storing the key in a first memory at the second node, wherein the first memory is capable of operating in a low power mode; detecting an outage event at the second node; in response to detecting the outage event, operating a first processor at the second node in the low power mode; and via the first processor operating in the low power mode: generating a message; retrieving the key from the first memory, wherein the first memory is operating in the low power mode; securing the message using the key; and sending the message to the first node.

Any and all combinations of any of the claim elements recited in any of the claims and/or any elements described in this application, in any fashion, fall within the contemplated scope of the present protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "module," a "system," or a "computer." In addition, any hardware and/or software technique, process, function, component, engine, module, or system described in the present disclosure may be implemented as a circuit or set of circuits. Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A method comprising:

detecting, by a first node in a mesh network while the first node is operating in a normal power mode, an outage event;

in response to detecting the outage event, switching to operating the first node and a first memory of the first node in a low power mode, wherein the first memory is capable of switching between operating in the normal power mode and in the low power mode where an amount of power used by the first memory is reduced; and while operating the first node and the first memory in the low power mode:

generating, by the first node, a first message;

securing, by the first node using a first key retrieved from the first memory, the first message, wherein the first key is stored in the first memory for securing messages in the low power mode, and a second key is stored in a key store for securing messages in the normal power mode; and sending, by the first node, the first message to a second node in the mesh network.

2. The method of claim 1, wherein generating, securing, and sending the first message are performed by a low-power processor of the first node, the low-power processor being different from a processor used by the first node in the normal power mode.

3. The method of claim 1, wherein the first message includes at least one of a reboot counter for the first node or a key identifier of the first key.

4. The method of claim 3, wherein the first message further includes a sequence number associated with the reboot counter.

5. The method of claim 1, further comprising receiving, by the first node while the first node is operating in the normal power mode, the first key from the second node.

6. The method of claim 1, wherein the first memory is a portion of a main memory used by the first node while the first node is operating in the low power mode.

7. The method of claim 1, wherein:

the mesh network comprises a plurality of nodes adjacent to the first node, wherein the plurality of nodes includes the second node, and wherein the method further comprises selecting, by the first node, a subset of the plurality of nodes adjacent to the first node as designated recipients of outage event messages sent by the first node, wherein the subset includes the second node.

8. The method of claim 7, further comprising:

for respective nodes in the selected subset of the plurality of nodes:

generating a respective key based on a respective trust level associated with the respective node; and sending the respective key to the respective node.

9. The method of claim 1, further comprising:

receiving, by the first node, a second message from a third node in the mesh network;

validating, by the first node, the second message; and forwarding, by the first node, the second message to the second node, wherein the forwarded second message is secured using the first key.

10. The method of claim 9, wherein validating the second message comprises determining whether a first reboot counter included in the second message is greater than a second reboot counter previously received from the third node.

11. One or more non-transitory computer-readable media storing program instructions that, when executed by one or more processors of a node device in a wireless network, cause the one or more processors to perform the steps of:

while the node device is in a normal power mode, determining that the node device should shut down; and in response to determining that the node device should shut down and before shutting down the node device:

transitioning the node device to a low power mode;

transitioning a first memory of the node device from a normal power mode to a low power mode; and while the node device is in the low power mode:

creating a status report;

retrieving a first key that is stored in the first memory for securing messages in the low power mode, wherein a second key is stored in a key store for securing messages in the normal power mode;

securing, using the first key, the status report; and transmitting the secured status report to a neighboring node device in the wireless network.

12. The one or more non-transitory computer-readable media of claim 11, wherein the status report is secured and transmitted using a low power processor that is separate from a main processor used while the node device is in the normal power mode.

13. The one or more non-transitory computer-readable media of claim 11, wherein securing the status report comprises at least one of encrypting the status report using the first key or authenticating the status report using the first key.

14. The one or more non-transitory computer-readable media of claim 11, wherein the status report includes a count of a number of times the node device has shut down.

15. The one or more non-transitory computer-readable media of claim 11, wherein the steps further comprise receiving, while the node device is in the normal power mode, the first key from the neighboring node device.

16. The one or more non-transitory computer-readable media of claim 11, wherein the steps further comprise:

receiving a second status report from another neighboring node device in the wireless network;

securing, using the first key, the second status report; and transmitting the secured second status report to the neighboring node device.

17. A networking device comprising:

a transceiver;

one or more processors;

a first memory for storing keys; and one or more second memories storing instructions that when executed by the one or more processors cause the one or more processors to perform operations comprising:

detecting, while an operating mode of the networking device is a normal power mode, a condition associated with an outage;

in response to detecting the condition, changing the operating mode of the network device and the first memory from the normal power mode to a low power mode; and while the operating mode of the networking device and the first memory is the low power mode:

loading a first key from the first memory, wherein the first key is stored in the first memory for securing messages in the low power mode, and a second key is stored in a key store for securing messages in the normal power mode;

securing, using the first key, an outage reporting message; and transmitting, using the transceiver, the secured outage reporting message to a second networking device.

18. The networking device of claim 17, wherein a first low power processor of the one or more processors performs the operations while the networking device is operating in the low power mode.

19. The networking device of claim 17, wherein the first key is received from the second networking device.

20. The networking device of claim 17, wherein the outage reporting message includes a reboot counter and a sequence number usable to validate the outage reporting message.

* * * * *